Dec. 12, 1944.  H. W. EAGLES  2,364,962
METHOD FOR JOINING HOLLOW THERMOPLASTIC ARTICLES
Filed Oct. 27, 1942
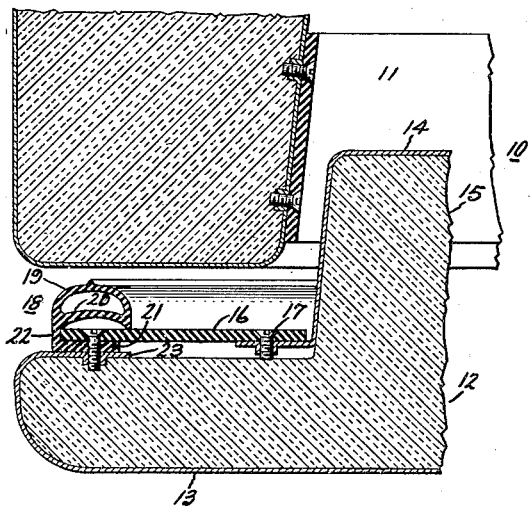
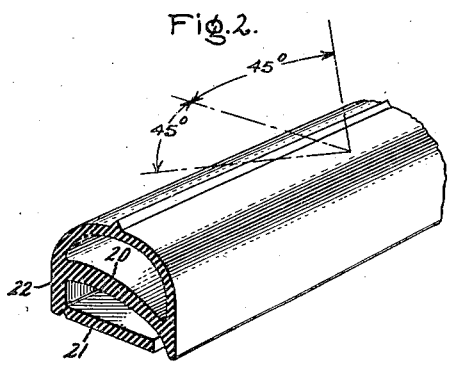
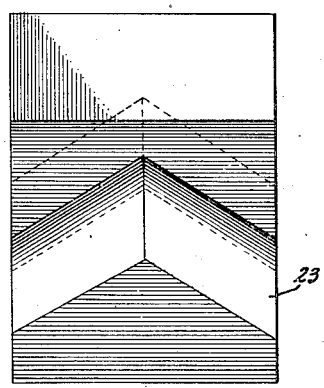
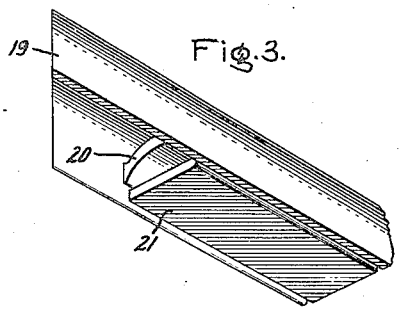
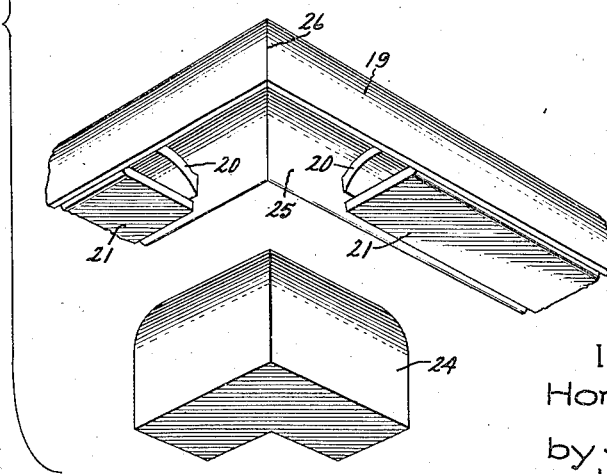
Inventor:
Horace W. Eagles,
by Harry E. Dunham.
His Attorney.

Patented Dec. 12, 1944

2,364,962

UNITED STATES PATENT OFFICE 2,364,962

METHOD FOR JOINING HOLLOW THERMOPLASTIC ARTICLES

Horace W. Eagles, Erie, Pa., assignor to General Electric Company, a corporation of New York Application October 27, 1942, Serial No. 463,499

3 Claims. (Cl. 154—42)

My invention relates to a method for joining hollow thermoplastic articles and more particularly to a method for forming joints in rubber gaskets especially adapted for use in refrigerator cabinets.

In the past, difficulty has been encountered in joining, as by vulcanizing, the ends of hollow rubber articles. For example, gaskets, such as refrigerator gaskets, have been made which comprise a tubular or hollow striking bead having a relatively flat base portion adapted to rest on a supporting member and a retaining portion which is spaced from and substantially parallel to the base portion for holding the gasket in the sealing position as on a door member of a refrigerator cabinet. The formation of a suitable corner structure for such a gasket, especially on right angle bends, has occasioned considerable difficulty in the art. In the past, a core has been inserted in the tubular or hollow portion of the striking bead and after the joint between adjacent sections of gasket has been completed, as by vulcanizing, it has been necessary to cut through the base portion of the striking bead in order to remove the core material. Furthermore, such a joint extending entirely around the periphery of the striking bead has resulted in a relatively stiff unyielding joint at each of the joints or corners so that the gasket is stiffer at the corners than throughout the remaining portion of the gasket and, therefore, the sealing effect is not uniform along the length of the gasket.

Accordingly, it is an object of my invention to provide a new and improved method for joining hollow rubber articles, which simplifies the process of joining such articles and provides a joint which is relatively flexible as compared with prior types of joints.

Other objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a partial sectional view of a refrigerator cabinet employing a gasket of the type to which my method has been applied; Fig. 2 is an enlarged perspective view of a section of the gasket shown in Fig. 1; Fig. 3 is an enlarged partial perspective view of the gasket section shown in Fig. 2 at one stage in my method of joining; and Fig. 4 illustrates apparatus used and the positions of the gasket sections during assembly.

Referring to the drawing, in Fig. 1 I have shown a small portion of a refrigerator cabinet 10 having suitable thermally insulated walls defining a food storage compartment 11. The cooling or food storage compartment is provided in the front wall with an opening which is closed by a suitable heat insulated door 12 comprising an outer shell or casing 13 and an inner liner 14, the space therebetween being filled with a suitable thermal insulating material as indicated by the numeral 15. The space between the outer casing and the inner liner is closed by a suitable breaker strip 16 which may be secured to the casing and liner, respectively, in any suitable manner as by means of suitable threaded fastening members 17.

In order to seal the opening between the wall of the cabinet and the door there is provided a sealing member or gasket 18 comprising a hollow or tubular striking bead 19 which has a base portion 20 and a retaining portion 21. The bead 19, and particularly the base portion 20, is adapted to rest against the breaker strip 16 when the door is in the closed position and the gasket is stressed. The retaining portion is adapted to be held between the breaker strip and the inturned flange 23 of the door 12. The outer wall of the striking bead may be extended downwardly to join the base portion of the striking bead and the retaining portion as indicated by the numeral 22.

I have provided a method for joining the ends of the gasket sections, especially at the corners of the door. If a right angle turn is to be made, the adjacent sections of gasket to be joined will be cut at a 45° angle as indicated in Fig. 2. It will be understood that one section of gasket may be thus prepared by cutting out a 90° wedge, leaving the portion 22 uncut, and then bending the gasket to close the gap or the gasket material may be cut entirely through, or separate pieces of material used, and the ends shaped to provide a 45° angle with the longitudinal axis of the gasket.

In Fig. 4 there is illustrated a suitable mold within which the vulcanizing process may take part. The mold comprises matching female and male sections 23 and 24. In order to permit ready application of the form to the adjacent gasket sections, the base and retaining portions of each gasket section are removed at the ends to be joined as best seen in Figs. 3 and 4.

With the arrangement above described, after removing the sections of the base portion and the retaining portion, the gasket sections are placed within the mold 23 with the remaining overhanging portions of the striking beads in abutting engagement and the section 24 is inserted into the opening or space 25 left by the removal of the base and retaining portions on the under side of the gasket. The vulcanization step may then be carried out in any suitable manner. Inasmuch as the actual vulcanization process forms no part of my present invention and is well understood, the details thereof are not described.

In Fig. 4 there is illustrated the insertion of a piece of uncured or vulcanizing rubber 26 between the ends of the gasket sections. If desired, the uncured rubber may be placed over the top of the bead 19 in order to insure filling the joint between the adjacent gasket sections.

From the foregoing discussion it will be seen that the former difficulties encountered in the removal of the core are obviated, if my method is practiced, because after the vulcanization step is completed it is simply necessary to separate the matching parts of the mold. Furthermore, since the completed joint does not have a vulcanized seam running around the entire striking bead, the resiliency of the gasket at the corner is substantially less than would be the case if the gasket had a vulcanized seam or joint running across the base portion as well as around the remaining portion of the striking bead. Therefore, the resiliency of the corners more closely approximates the resiliency of the remaining portions of the gasket.

While I have shown a particular embodiment of my invention, I do not desire my invention to be limited to the particular construction shown and described. My invention has been described in connection with refrigerator gaskets but is applicable wherever hollow or recessed rubber articles are joined. I intend in the appended claims to cover all modifications within the spirit and scope of my invention.

What I claim as new and desire to secure by Letters Patent of the United States is:

1. The method of joining hollow rubber articles comprising the steps of removing portions of each article at the ends to be joined whereby overhanging portions are left at said ends, placing said articles in a mold having matching male and female parts with the overhanging portions to be joined closely adjacent, and vulcanizing the rubber in said overhanging portion to form a joint at said ends.

2. The method of joining gasket sections of the type having a hollow striking bead including a base portion and a retaining portion spaced from and substantially parallel to said base portion, comprising the steps of removing the base and retaining portions of each gasket section at the ends to be joined whereby overhanging portions of the striking beads remain beyond the base and retaining portions at the ends of the sections, placing uncured rubber between said ends, placing said overhanging portions of said sections and said uncured rubber in a mold having matching male and female parts with the male part of the mold in the hollow beads in the spaces left by the removal of the base and retaining portions, and vulcanizing said sections.

3. The method of joining gasket sections of the type having a hollow striking bead including a base portion and a retaining portion spaced from and substantially parallel to said base portion, comprising the steps of removing the base and retaining portions of each gasket section at the ends to be joined whereby overhanging portions of the striking beads remain beyond the base and retaining portions at the ends of the sections, placing uncured rubber between said ends and over the top of said striking bead, placing said overhanging portions of said sections and said uncured rubber in a mold having matching male and female parts with the male part of the mold in the hollow beads in the spaces left by the removal of the base and retaining portions, and vulcanizing said sections.

HORACE W. EAGLES.